(12) United States Patent
Gillett

(10) Patent No.: US 9,398,164 B2
(45) Date of Patent: Jul. 19, 2016

(54) PROVIDING NOTIFICATIONS OF CALL-RELATED SERVICES

(71) Applicant: Microsoft Technology Licensing, LLC, Redmond, WA (US)

(72) Inventor: Mark Alastair Gillett, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 13/789,500

(22) Filed: Mar. 7, 2013

(65) Prior Publication Data

US 2014/0211666 A1    Jul. 31, 2014

(30) Foreign Application Priority Data

Jan. 28, 2013  (GB) .................................. 1301452.7

(51) Int. Cl.
*H04M 7/00* (2006.01)
*H04M 1/253* (2006.01)
(Continued)

(52) U.S. Cl.
CPC ......... *H04M 7/0087* (2013.01); *H04L 65/1069* (2013.01); *H04L 65/80* (2013.01); *H04M 1/7253* (2013.01); *H04N 7/147* (2013.01); *H04N 7/148* (2013.01); *H04N 21/4788* (2013.01);
(Continued)

(58) Field of Classification Search
CPC ..... H04W 64/00; H04W 4/001; H04W 4/023; H04W 8/005; H04W 4/02; H04W 76/023; H04M 1/7253; H04M 1/2535; H04M 7/0087; H04N 7/147; H04N 7/148; H04N 21/4788; H04N 21/485; H04N 21/4882; H04L 65/1069; H04L 65/80

USPC ........... 370/252, 261, 338; 455/417, 419, 420
See application file for complete search history.

(56) References Cited

U.S. PATENT DOCUMENTS 6,449,284 B1  9/2002  Hagirahim
6,654,722 B1  11/2003  Aldous et al.
(Continued)

FOREIGN PATENT DOCUMENTS

EP    1475939    11/2004
EP    1816843    8/2007
(Continued)

OTHER PUBLICATIONS

"Bluetooth Profile", downloaded Jun. 28, 2010 from http:/_/en.wikipedia.org/w/index.php?title=Bluetooth_profile&oldid=330823199, accessed Dec. 10, 2009, (Dec. 10, 2009), 9 pages.
(Continued)

*Primary Examiner* — Jianye Wu
(74) *Attorney, Agent, or Firm* — Tom Wong; Micky Minhas

(57) ABSTRACT

The disclosure relates to a first near-end terminal, the first near-end terminal being a mobile user terminal operable to establish voice or video calls with one or more far-end user terminals over a network. A detection module detects when the first near-end terminal is within a relative proximity of a second near-end terminal available to provide a call-related service in relation to one or more of the voice or video calls. A notification module outputs a notification to a user of the first near-end terminal based on said detection, notifying the user of the call-related service. In response to said detection, a configuration module is operable to store a configuration configuring the first near-end terminal as having the second near-end terminal identified for later provision of the call-related service.

20 Claims, 2 Drawing Sheets

(51) Int. Cl.

| | | |
|---|---|---|
| *H04N 7/14* | (2006.01) | |
| *H04N 21/4788* | (2011.01) | |
| *H04N 21/485* | (2011.01) | |
| *H04W 4/02* | (2009.01) | |
| *H04N 21/488* | (2011.01) | |
| *H04M 1/725* | (2006.01) | |
| *H04L 29/06* | (2006.01) | |
| *H04W 76/02* | (2009.01) | |
| *H04W 64/00* | (2009.01) | |
| *H04W 4/00* | (2009.01) | |
| *H04W 8/00* | (2009.01) | |

(52) U.S. Cl.
CPC ......... *H04N21/485* (2013.01); *H04N 21/4882*
(2013.01); *H04W 4/02* (2013.01); *H04W 64/00*
(2013.01); *H04W 76/023* (2013.01); *H04M*
*1/2535* (2013.01); *H04W 4/001* (2013.01);
*H04W 4/008* (2013.01); *H04W 4/023* (2013.01);
*H04W 8/005* (2013.01)

(56) References Cited

U.S. PATENT DOCUMENTS

| | | | |
|---|---|---|---|
| 6,904,025 B1 | 6/2005 | Madour et al. | |
| 6,985,961 B1 | 1/2006 | Ramsayer et al. | |
| 7,039,205 B1 | 5/2006 | Carter et al. | |
| 7,260,186 B2 | 8/2007 | Zhu et al. | |
| 7,301,919 B2 | 11/2007 | Sundquist et al. | |
| 7,526,253 B2 | 4/2009 | Fujioka | |
| 7,668,537 B2 | 2/2010 | De Vries | |
| 7,673,001 B1 | 3/2010 | Battle et al. | |
| 7,693,133 B2 | 4/2010 | Benco et al. | |
| 7,769,837 B2 * | 8/2010 | Nogawa et al. | 709/222 |
| 7,908,630 B2 | 3/2011 | Crandall et al. | |
| 8,090,780 B2 | 1/2012 | Hjelmeland Almas et al. | |
| 8,593,501 B1 * | 11/2013 | Kjeldaas | H04N 7/15 348/14.01 |
| 2002/0034166 A1 | 3/2002 | Barany et al. | |
| 2003/0023730 A1 | 1/2003 | Wengrovitz et al. | |
| 2003/0177099 A1 | 9/2003 | Gallant et al. | |
| 2004/0083297 A1 | 4/2004 | Gazzetta et al. | |
| 2004/0194146 A1 | 9/2004 | Bates et al. | |
| 2005/0021872 A1 | 1/2005 | Poustchi et al. | |
| 2005/0034079 A1 | 2/2005 | Gunasekar et al. | |
| 2005/0122963 A1 | 6/2005 | Jeon et al. | |
| 2005/0197061 A1 | 9/2005 | Hundal | |
| 2005/0268334 A1 | 12/2005 | Hesselink et al. | |
| 2005/0278778 A1 | 12/2005 | D'Agostino et al. | |
| 2006/0013194 A1 | 1/2006 | Baumann et al. | |
| 2006/0045070 A1 | 3/2006 | Fotta et al. | |
| 2006/0143425 A1 * | 6/2006 | Igarashi et al. | 711/173 |
| 2007/0091833 A1 | 4/2007 | Bauchot et al. | |
| 2007/0115348 A1 | 5/2007 | Eppel et al. | |
| 2007/0280200 A1 | 12/2007 | Patel | |
| 2008/0032703 A1 | 2/2008 | Krumm et al. | |
| 2008/0062940 A1 | 3/2008 | Othmer et al. | |
| 2008/0069069 A1 | 3/2008 | Schessel et al. | |
| 2008/0069087 A1 | 3/2008 | Igoe | |
| 2008/0075240 A1 | 3/2008 | Ramanathan et al. | |
| 2008/0081698 A1 | 4/2008 | Wormald et al. | |
| 2008/0091682 A1 | 4/2008 | Lim | |
| 2008/0157998 A1 | 7/2008 | Zuo et al. | |
| 2008/0182546 A1 | 7/2008 | Wang et al. | |
| 2008/0235587 A1 | 9/2008 | Heie et al. | |
| 2008/0239995 A1 | 10/2008 | Lee et al. | |
| 2009/0017792 A1 | 1/2009 | Matsumoto et al. | |
| 2009/0046839 A1 | 2/2009 | Chow et al. | |
| 2009/0049190 A1 | 2/2009 | Jiang et al. | |
| 2009/0094684 A1 | 4/2009 | Chinnusamy et al. | |
| 2009/0136016 A1 | 5/2009 | Gornoi et al. | |
| 2009/0138697 A1 | 5/2009 | Kim | |
| 2009/0168756 A1 | 7/2009 | Kurapati et al. | |
| 2009/0175509 A1 | 7/2009 | Gonion et al. | |
| 2009/0177601 A1 | 7/2009 | Huang et al. | |
| 2009/0238170 A1 | 9/2009 | Rajan et al. | |
| 2009/0280789 A1 | 11/2009 | Takumo et al. | |
| 2009/0282130 A1 * | 11/2009 | Antoniou et al. | 709/220 |
| 2010/0008523 A1 | 1/2010 | Demuynck et al. | |
| 2010/0020729 A1 | 1/2010 | Walley et al. | |
| 2010/0056055 A1 | 3/2010 | Ketari | |
| 2010/0216402 A1 * | 8/2010 | Appleby et al. | 455/41.3 |
| 2011/0021200 A1 | 1/2011 | Yi et al. | |
| 2011/0110504 A1 | 5/2011 | Kaal et al. | |
| 2011/0119490 A1 | 5/2011 | Kaal et al. | |
| 2011/0151892 A1 | 6/2011 | Vengroff et al. | |
| 2011/0216671 A1 | 9/2011 | Walley et al. | |
| 2011/0222466 A1 * | 9/2011 | Pance | H04Q 3/0029 370/316 |
| 2011/0242266 A1 | 10/2011 | Blackburn et al. | |
| 2011/0242270 A1 | 10/2011 | Dinka | |
| 2011/0243125 A1 | 10/2011 | Kaal et al. | |
| 2011/0243140 A1 | 10/2011 | Musku et al. | |
| 2011/0243141 A1 | 10/2011 | Blackburn et al. | |
| 2011/0244955 A1 | 10/2011 | Dinka et al. | |
| 2012/0062758 A1 | 3/2012 | Devine et al. | |
| 2012/0173897 A1 | 7/2012 | Karkaria et al. | |
| 2012/0176976 A1 | 7/2012 | Wells | |
| 2012/0182988 A1 | 7/2012 | Brenes | |
| 2012/0206553 A1 | 8/2012 | MacDonald | |
| 2012/0207147 A1 | 8/2012 | MacDonald | |
| 2012/0278454 A1 * | 11/2012 | Stewart et al. | 709/220 |
| 2013/0072173 A1 * | 3/2013 | Brady | H04M 19/04 455/418 |
| 2013/0106587 A1 * | 5/2013 | Reams | 340/12.52 |
| 2013/0136089 A1 * | 5/2013 | Gillett | H04W 72/048 370/329 |
| 2014/0016608 A1 | 1/2014 | Buer et al. | |
| 2014/0073300 A1 * | 3/2014 | Leeder et al. | 455/416 |
| 2014/0122244 A1 | 5/2014 | Arrasvuori et al. | |
| 2016/0044574 A1 | 2/2016 | Naqvi | |

FOREIGN PATENT DOCUMENTS

| | | | |
|---|---|---|---|
| EP | 1909467 | 4/2008 | |
| EP | 2063612 | 5/2009 | |
| EP | 2088735 | 8/2009 | |
| EP | 2114062 | 11/2009 | |
| EP | 2056601 | 8/2011 | |
| GB | 2479180 | 10/2011 | |
| JP | 200586765 | 3/2005 | |
| WO | WO-2004066604 | 8/2004 | |
| WO | WO-2005008524 | 1/2005 | |
| WO | WO-2005009019 | 1/2005 | |
| WO | WO2005009019 | 1/2005 | |
| WO | WO-2005057969 | 6/2005 | |
| WO | WO 2005057969 A1 * | 6/2005 | H04Q 7/32 |
| WO | WO-2006051492 | 5/2006 | |
| WO | WO-2006058036 | 6/2006 | |
| WO | WO-2007023208 | 3/2007 | |
| WO | WO-2007137485 | 6/2007 | |
| WO | WO-2007118250 | 10/2007 | |
| WO | WO-2008015369 | 2/2008 | |
| WO | WO-2009115048 | 9/2009 | |
| WO | WO-2010026187 | 3/2010 | |
| WO | WO-2010026188 | 3/2010 | |
| WO | WO-2010026189 | 3/2010 | |
| WO | WO-2010026190 | 3/2010 | |
| WO | WO-2010026191 | 3/2010 | |
| WO | WO-2010026194 | 3/2010 | |
| WO | WO-2010026196 | 3/2010 | |
| WO | WO-2011120948 | 10/2011 | |
| WO | WO-2011120991 | 10/2011 | |
| WO | WO-2011120992 | 10/2011 | |
| WO | WO-2011121006 | 10/2011 | |

OTHER PUBLICATIONS

"Femtocell", downloaded Jun. 28, 2010 from http://en.wikipedia.org/w/iindex.php?title=Femtocell&oldid=330068819, accessed Dec. 10, 2009, (Dec. 6, 2009), 8 pages.

Final Office Action, U.S. Appl. No. 12/290,232, (Dec. 6, 2012), 18 pages.

(56) References Cited

OTHER PUBLICATIONS

Final Office Action, U.S. Appl. No. 12/843,543, (Aug. 3, 2012), 8 pages.
International Search and Written Opinion, Application No. PCT/EP2011/054781, (May 23, 2011), 13 pages.
International Search Report and Written Opinion, Application No. PCT/EP2011/054864, (May 31, 2011), 13 pages.
International Search Report and Written Opinion, Application No. PCT/EP2011/054862, (Jun. 27, 2011), 17 pages.
International Search Report and Written Opinion, Application No. PCT/EP2011/054881, (Jul. 25, 2011), 18 pages.
International Search Report and Written Opinion, Application No. PCT/EP2010/066562, (Feb. 23, 2011), 11 pages.
International Search Report and Written Opinion, Application No. PCT/EP2010/066561, (Sep. 26, 2011), 13 pages.
International Search Report and Written Opinion, Application No. PCT/EP2011/054879, (Jun. 24, 2011), 13 pages.
International Search Report and Written Opinion, International Application No. PCT/EP2011/074303, (May 29, 2012), 11 pages.
International Search Report, Application No. PCT/EP2011/074304, (Feb. 7, 2012), 3 pages.
"IP-DECT", downloaded Jun. 28, 2010 from http://en.wikipedia.org/w/index.phptitle=IPDECT&oldid=322769463, accessed Dec. 10, 2009, (Oct. 29, 2009), 1 page.
"MagicJack Harnesses Femtocell for VoIP", downloaded Jun. 28, 2010 from http://.pcworld.com/article/186308/magicjack_harnesses_femtocell_for_voip.html, dated Jan. 8, 2010, accessed Feb. 4, 2010, 7 pages.
Non-Final Office Action, U.S. Appl. No. 12/290,232, (Jun. 11, 2012), 16 pages.
Non-Final Office Action, U.S. Appl. No. 12/824,681, (Oct. 10, 2012), 13 pages.
Non-Final Office Action, U.S. Appl. No. 12/843,543, (May 29, 2012), 9 pages.
Non-Final Office Action, U.S. Appl. No. 12/843,569, (Apr. 4, 2012), 13 pages.
Non-Final Office Action, U.S. Appl. No. 12/941,585, (Dec. 31, 2012), 11 pages.
"PCT Search Report and Written Opinion", Application No. PCT/EP2011/074302, (Mar. 6, 2012), 11 pages.
Search Report, Application No. GB1005462.5, (Jul. 28, 2011), 2 pages.
Search Report, GB Application 0919591.8, (Feb. 23, 2011), 2 pages.
Search Report, GB Application 0919592.6, (Feb. 24, 2011), 1 page.
"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.
Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.
Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.
Saint-Andre, Peter "Streaming XML with Jabber/XMPP", IEEE Internet Computing, vol. 9, No. 5,(Sep. 1, 2005), pp. 82-89.
David, et al., "A Location-Based Notification- and Visualization-System Indicating Social Activities", Retrieved at<<http://144.206.159.178/ft/CONF/16428080/16428101.pdf>>, Proceedings of the SPIE-IS&T Electronic Imaging, 2009, Jan. 28, 2009, pp. 7.
"International Search Report and Written Opinion", Application No. PCT/US2014/013086, Jul. 24, 2014, 8 Pages.
"Non-Final Office Action", U.S. Appl. No. 13/752,298, Dec. 19, 2014, 28 pages.
"Second Written Opinion", Application No. PCT/US2014/013086, Jan. 28, 2015, 5 Pages.
"Final Office Action", U.S. Appl. No. 13/752,298, Jun. 18, 2015, 27 pages.
"Non-Final Office Action", U.S. Appl. No. 13/752,298, Oct. 8, 2015, 27 pages.
Final Office Action, U.S. Appl. No. 13/752,298, Apr. 5, 2016, 30 pages.

\* cited by examiner

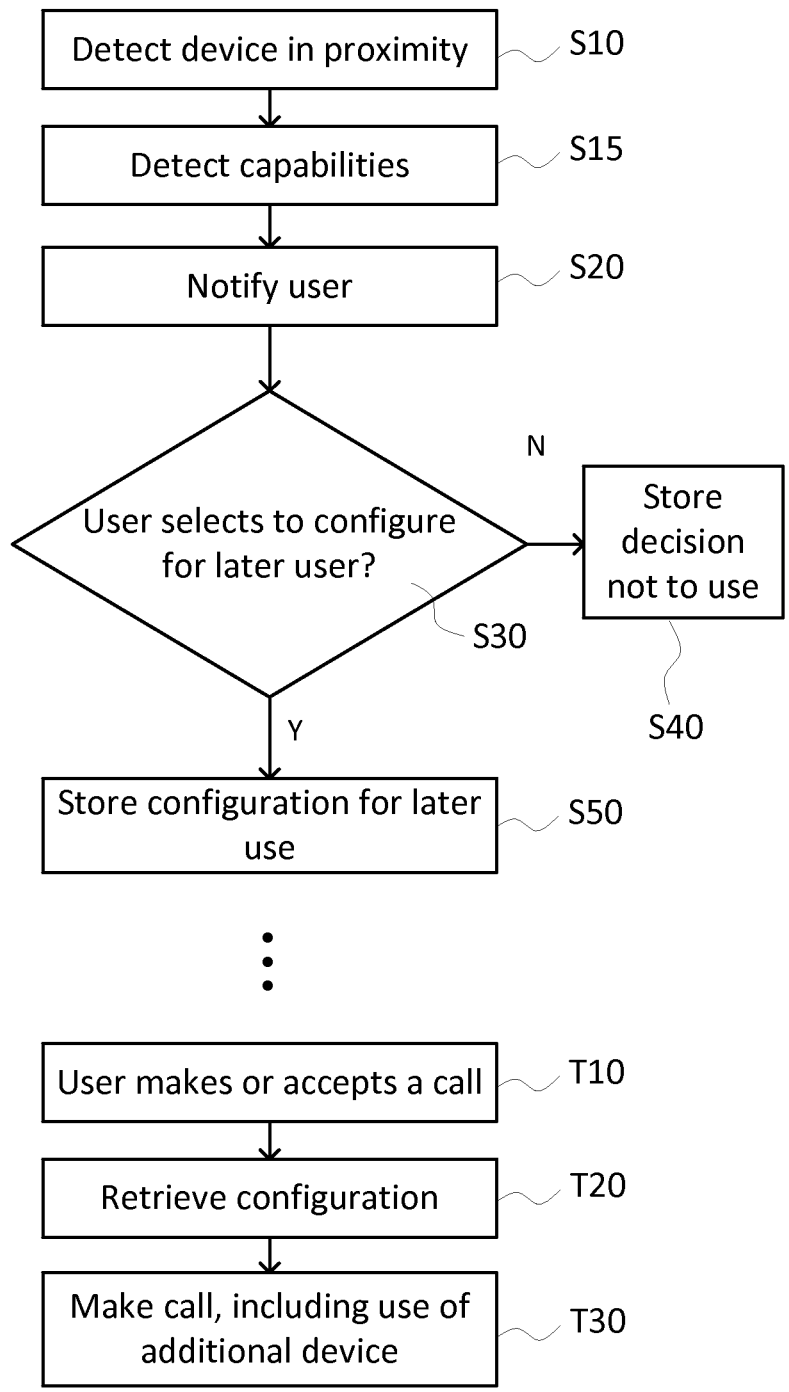

PROVIDING NOTIFICATIONS OF CALL-RELATED SERVICES

RELATED APPLICATION

This application claims priority under 35 USC 119 or 365 to Great Britain Application No. 1301452.7 filed Jan. 28, 2013, the disclosure of which is incorporate in its entirety.

BACKGROUND

VoIP (voice over IP) allows users to make voice or video calls over packet-based networks such as the Internet. Traditionally VoIP (voice over IP) calls have been accessed using desktop or laptop computers, but increasingly nowadays the user tends to have a number of devices around the home or office that can potentially be used in VoIP calls or other such packet-based telephony.

However, organizing or coordinating the use of these different devices is not necessarily straightforward for the user, or user may not even be aware when different devices are available to provide VoIP services or the like.

SUMMARY

According to one aspect, the disclosure herein relates to an apparatus for use in relation to a first near-end terminal, the first near-end terminal being a mobile user terminal such as a mobile phone, tablet or laptop computer, operable to establish voice or video calls with one or more far-end user terminals over a network, e.g. VoIP calls. In embodiments the apparatus may be implemented at the first near-end user terminal, or at an intermediate network element such as a server, or router or access point of a local wireless network. The apparatus comprises a detection module, a notification module and a configuration module (which in embodiments may be implemented as portions of code arranged for execution on one or more processors of the apparatus). These are arranged to operate as follows.

The detection module detects when the first near-end terminal is within a relative proximity of a second near-end terminal which is available to provide a call-related service in relation to one or more of the voice or video calls. For example the detection may be made on the basis that the first and second near-end terminals are both found on the same local network; e.g. same wireless local area network such as a Wi-Fi network, or same wireless ad-hoc network such as a Bluetooth network. Other options for detecting proximity are also possible, as will be discussed in more detail later. As for the call-related service, in embodiments for example, this may comprise the possibility of using the second near-end terminal as a media end-point for one of the calls established from the first near-end terminal, so that the second near-end terminal plays out or generates at least one audio or video stream of the call while the first terminal controls the call and/or plays out one or more other audio or video streams of the same call. E.g. the second near-end terminal could comprise another mobile terminal such as a phone, tablet or laptop for use as a remote microphone or camera; or a terminal such as a desktop computer, television, set-top box or stereo or hi-fi unit for use to play out the audio or video of the call.

Based on the detection, the notification module outputs a notification to a user of the first near-end terminal, notifying the user of the call-related service. In embodiments the notification may prompt the user as to whether he or she wishes to accept use of the call-related service from the second near-end terminal (e.g. whether he or she would like to have another terminal like a tablet, TV, etc. set for use as a secondary media end-point to play out or generate the voice or video of the call). Further, in response to the detection (and assuming any user prompt is accepted), the configuration module is operable to store a configuration setting configuring the first near-end terminal as having the second near-end terminal identified for later provision of the call-related service, i.e. to store the configuration setting in a non-volatile storage medium for use of the service on another occasion. In an example use case, this means the user and his or her first (mobile) terminal can depart from the proximity of the second terminal (e.g. leaving the house when the second terminal is a household appliance like a TV), then return and already have the second terminal pre-configured at the first terminal for use in subsequent calls.

In this way, the user may be notified when call-related services are available from one or more other nearby terminals, while the configuration module handles the storing of the relevant setting allowing the call-related service to be pre-configured for use whenever the user later wishes to conduct a call, without having to re-configure on each occasion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present disclosure and to show how in embodiments it may be put into effect, reference is made by way of example to the accompanying drawings in which:

FIG. 3 is a flow chart schematically illustrating a method of providing notifications.

DETAILED DESCRIPTION

According to embodiments disclosed herein, a notification is provided to a device within the proximity of another device. The notification may be intended for a particular device, user or type of device. The notification may serve to either announce a resource or provide a user defined message (e.g. notes or announcements). The notification may be displayed to the user when the second device is detected, or alternatively only when the user performs an action such as initiating or starting a call.

Embodiments may be carried out as follows: 1) detect that the first device is co-located with a second device—this may be achieved for example by determining that the first and second devices are connected to the same network; and 2) responsive to detecting that the devices are co-located, activating a service to the user and optionally providing a notification to the user that the service is available.

The teachings disclosed herein may be implemented in a number of scenarios, for example:

I) a mobile computing and/or communication device (e.g. phone) may be offered access to a service provided by a TV or games console, such as an offer of consuming the larger, more appropriate screen to render incoming video;

II) a mobile computing device might offer its local/mobile services such as audio capture to a fixed device (e.g. to use the mobile device as a remote microphone); or III) an anchor device such as an ATA (analogue telephone adaptor) might offer access to a locally available service (such as incoming phone calls rendered at the ATA).

Figure 1:
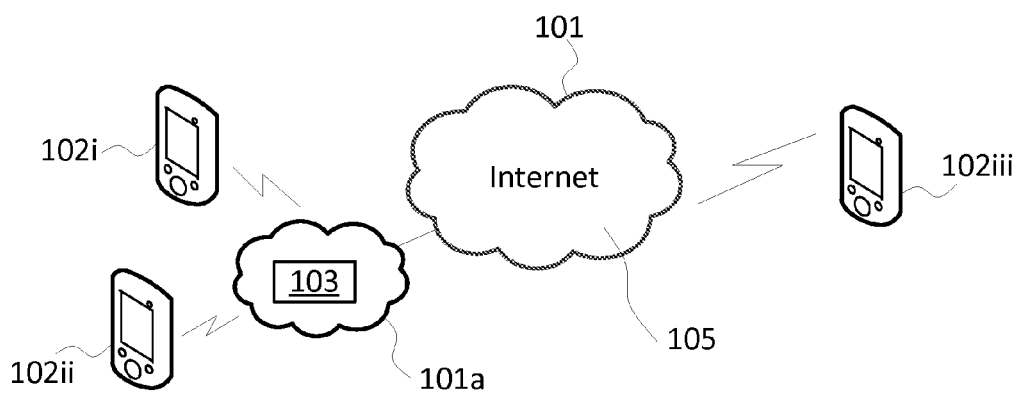
FIG. 1 is a schematic representation of a mobile communication system.

FIG. 1 gives a schematic example of a communication system in which embodiments disclosed herein may be deployed. The system comprises a first near-end device in the form of a first mobile user terminal 102i and a second near-end device in the form of a second user terminal 102ii, which may be a mobile or fixed terminal. Each of the user terminals 102 may be any user terminal capable of electronic communications, such as a mobile phone, tablet, laptop or desktop computer, TV set, set-top box, games console, etc.

The system also comprises a packet-switched network 101 which may take the form of a wide-area inter network such as the Internet, or alternatively a private network. The packet-switched network 101 may comprises a sub network 101a, e.g. a wireless local area network (WLAN), comprising wireless network equipment 103 by which the mobile user terminals 102 can access the wireless sub network 101a and the wider network 101. For example the wireless equipment may comprise a wireless access point such as a wi-fi access point (e.g. providing coverage within a café, bar, shop, mall or other retail complex, or railway or bus station, airport or other transport hub); or a wireless router providing coverage in the home (e.g. covering a single home or an apartment block or complex) or office (e.g. covering a single office or company or a plurality of offices or companies within a block or complex).

The packet-switched network 101 also comprises other network equipment 105 such as wired switches and routers, and/or other wired or wireless sub networks, via which one or more further, far-end user terminals 102iii may connect to the wider network 101. The first (near-end) user terminal 102i is arranged to conduct a voice or video call with one or more such far-end user terminals 102iii over the sub-network 101a (e.g. wireless LAN) and wider packet-based network 101 (e.g. internet).

Further, the first near-end user terminal 102i is configured to detect presence of one or more second near-end terminals 102ii on the same wireless LAN or other such local or sub network. In this way the first and second near-end terminals may be determined to be approximately co-located, e.g. as they share the same home or office network.

In some alternative or additional embodiments, one or both of the first and second mobile user terminals 102i, 102ii may be equipped with at least one geographic location technology for determining the location of that mobile user terminal, in terms of geographic position relative to the surface of the earth; for example, a satellite based positioning system such as GPS (Global Positioning System, including potential variants such as assisted GPS or differential GPS), GLONASS (Global Navigation Satellite System) or Galileo; and/or trilateration (or more generally multilateration) relative to a plurality of different wireless base stations or access points having known locations; and/or a technique based on detecting signal strength relative to a known base station or access point. In another example, one or both of the first and second mobile user terminals 102i, 102ii may be registered with a location service allowing look-up of their geographic position from a server mapping device identifiers (e.g. IP addresses) to locations.

At least one of the second near-end terminals 102ii is operable to be involved in the call established by the first near-end user terminal 102i with the far-end terminal 102iii, by providing a call-related service such as acting as a media end-point. In some example use cases, the first near-end terminal 102i may be a laptop, tablet or desktop computer and the second near-end terminal 102ii may be a mobile phone available to provide the service of providing a remote microphone or camera, to capture a voice or video stream of the call. In another example, the first near-end terminal 102i may be a mobile phone and the second near-end terminal 102ii may be a tablet, laptop, desktop or TV available to provide the service of playing out a video stream of the call.

Figure 2:
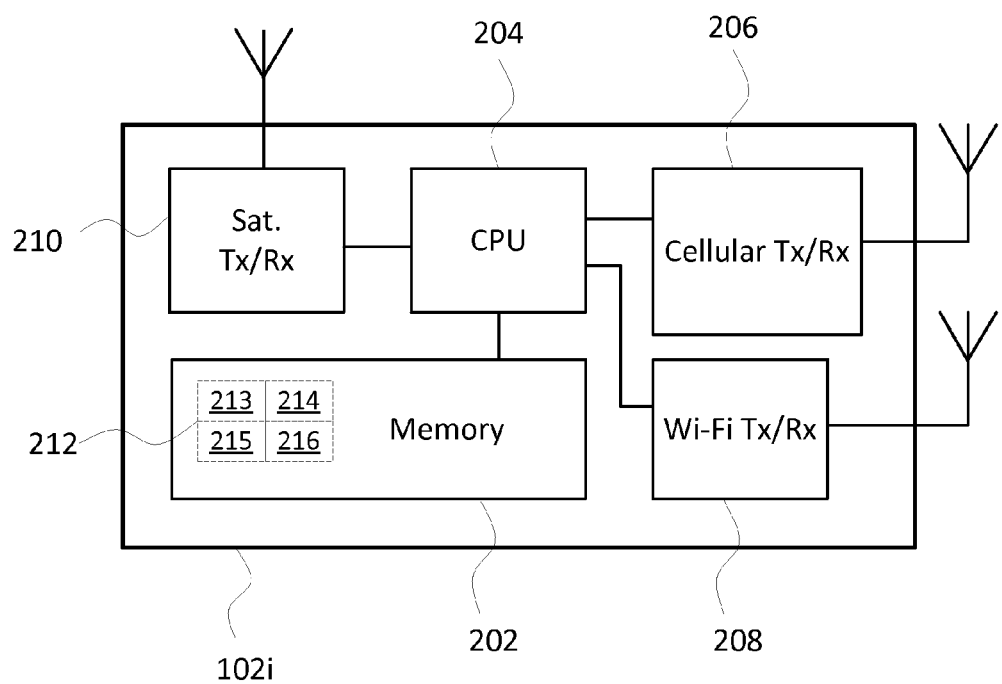
FIG. 2 is a schematic block diagram of a mobile user terminal.

FIG. 2 is a schematic block diagram of a mobile user terminal 102 as might be instantiated by the first user terminal 102i. The mobile user terminal 102 comprises a processor 204 in the form of a central processing unit (CPU) comprising one or more cores or execution units, and storage 202 in the form of a memory comprising one or more memory devices comprising one or more storage media (e.g. a magnetic storage medium such as a hard disk or electronic storage such as EEPROM or "flash" memory). The mobile user terminal 102 also comprises one or more wireless transceivers, in embodiments comprising a cellular transceiver 206 for connecting to the packet-switched network 101 via a mobile cellular network such as a 3GPP network (parts of which may form part of the equipment 105 of the packet-switched network 101), and/or a local wireless transceiver 108 such as a wi-fi transceiver for connecting to the packet switched network 101 via one or more wireless access points 103 of one or more sub networks 101a of the packet-switched network (again at least in part forming some of the equipment of the packet-switched network 101).

The memory 202 stores computer-readable code arranged to be executed on the processor 204. This comprises a VoIP or other communication client application 212 comprising a call engine 213, a detection module 214, a user interface comprising a notification module 215, and a configuration module 216. The call engine 213 comprises a call set-up protocol and is thereby arranged to establish VoIP calls (or other packet-based calls) with the far-end terminal 102iii. The detection module 214 is arranged to determine whether the first and second near-end terminals 102i, 102ii are within a suitable proximity for provision of one or more call-related services from the second terminal 102ii to the first near-end terminal 102i, and to detect one or more capabilities of the second-near-end terminal 102ii to determine whether the second terminal is operable to provide any such call-related services. In embodiments this is performed by detecting the second near-end terminal on the same local sub-network 101a, e.g. via local transceiver 108. The notification module 215 is arranged to provide notifications to the user of the first terminal 102i, e.g. displayed on a screen of the first terminal 102i, if proximity of one or more call-related services from one or more other terminals is detected by the detection module 214. The configuration module is arranged to store a configuration setting of the first terminal 102i in a non-volatile storage unit, e.g. in the storage 202 of the first terminal 102i, to thereby set the first near-end user terminal 102i as being configured for using of any detected call-related services.

In order to determine whether the first and second near-end terminals 102i, 102ii are suitably co-located, it is possible to exploit knowledge of the network to which both the terminals 102i, 102ii are connected. That is, the system exploits the fact that at least some portion of the network 101a provides an infrastructure that is fixed, or at least can be assumed to be substantially fixed relative to the first and second terminals 102i, 102ii. For example if it is known that the first terminal is substantially co-located with a part of the network 101a such as a sub network 101a corresponding to an access point or router 103, and the second terminal 102ii is also known to be co-located with that same sub network 101a, and it is assumed that the sub-network provides a fixed frame of reference, then it can be determined appropriate to consider the first terminal and second terminals 102i, 102ii effectively co-located.

In an example use case, a user has both a mobile phone 102i and a household or office appliance such as a desktop computer, TV or games console 102i connected to a home router 103. The two devices may be able to find each other because they are on the same local network 101a, e.g. same home or office wireless LAN. Further, the first device 102i can exploit the fact that the router 103 of sub-network 101a can be assumed to be a fixed reference point for the two devices, and thereby determine that it is substantially co-located with the second device 102ii (e.g. in the same house, apartment or office).

Note that in embodiments, the second near-end terminal need not comprise a full instance of the communication client 212. The complementary application on the second near-end terminal 102ii can be a "stripped down" or "dumb" version of the client that does not comprise call set-up protocol and is not in itself capable of establishing a call with the far-end terminal 102iii, and may in fact have minimal capability. Instead, the dumb client on the second near-end terminal 102ii may comprise, in the least, a module for performing the relevant call-related service, e.g. playing out audio or video streamed to it over the local network 101a, or providing captured audio or video over the local network 101a; and for communicating its presence and available service(s) on the local network 101a.

FIG. 3 shows a schematic flow chart of a method that may be implemented by the client application 212 run on the first terminal 102i.

At Step S10, the detection module 214 on the first near-end terminal checks whether it can detect any second-near end terminal 102ii within a suitable proximity for providing call related services (more detail for implementing this will be discussed below). If so, the detection module 214 determines an identifier of the second near-end terminal 102ii, e.g. an address identifying it on the local network 101a or the wider network 101. At step S15, the detection module 214 also detects the capabilities of the detected terminal 102ii to determine whether it can provide any suitable call-related services, e.g. whether it can act as remote microphone, or whether it can provide a screen for playing out video of a call. For example this may comprise querying the second near-end terminal 102ii over the local network 101a, or detecting a message advertised by the second near-end terminal 102ii over the local network 101a. Thus according to step S10 and S15, the detection module 214 is able to discover at least an indication that the second terminal 102ii is nearby, an identifier of that second terminal 102ii (e.g. its address), and an indication of one or more capabilities of the second terminal 102ii (i.e. what service or services it can provide). The indication of the capability may comprise or include an indication of what type of device the second terminal 102ii is, e.g. phone, tablet, laptop, TV, games console etc.

At step S20, if one such service from a second near-end terminal was detected, the notification module 215 automatically outputs a notification to the user, e.g. on a screen of the first terminal 102i. The notification may indicate the second terminal's identity, type, the service and/or the proximity. In some embodiments the notification may comprise a user defined element, defined by a user of the first and/or second near-end terminal 102i, 102ii (e.g. "Hi, this is my device, Dave"). In some further embodiments the notification may be dependent on what type of device the first terminal 102i is, or what type of device the second terminal 102ii is, or on the combination of the types of the first and second terminals 102i, 102ii. E.g. the notification that a TV set is available for playing out the video of a call may be more emphatic when the first terminal 102i is a mobile phone (having a small screen) than if it is a tablet or laptop (having a larger screen), or alternatively the notification may only be displayed on condition that the first terminal 102i is a certain type of terminal like a mobile phone and not if it is another type like a tablet or laptop.

Further, the notification may prompt the user of the first near-end terminal 102i as to whether they wish to accept the offer of the call-related service from the second near-end terminal 102ii. At step S30 the notification module 215 receives the user's selection in response to this prompt and determines whether it is affirmative.

If not, at step S40 the configuration module 216 stores the user's selection not to accept the service as a configuration setting in a non-volatile storage unit such as the storage 202 on the first terminal 102i itself. If the user does select to accept the service on the other hand, the configuration module 216 instead stores this selection as a configuration setting in the non-volatile storage. The first near-end terminal 102i is thus configured to be able to make use of the call-related service offered by the second near-end terminal 102ii. The configuration may be stored indefinitely (e.g. until the user cancels the setting or resets the device) so as to remain valid not just at the time the second near-end terminal is detected (at which time the user may not wish to make a call), but to pre-configure the first terminal 102i with the setting for use of the service on one or more future occasions. For example, if the second terminal 102i is a household appliance on a home network and the user then leaves the house and returns later, the setting remains stored to continue to indicate the user's selection if he or she then makes or accepts a call at that later time.

As well as the user selection itself, in embodiments the configuration setting comprises one or more of:
- an identifier of the accepted second terminal 102ii (e.g. its address on the local network 101a or wider network 101);
- a name for the second terminal 102ii mapped to its identifier (e.g. entered by the user of the first terminal 102i or communicated from the second terminal 102ii);
- an indication of when or in what circumstance(s) the second terminal 102ii is expected to be in proximity (e.g. an identifier of the local network 101a it was originally found on, e.g. an SSID); and/or
- an indication of the second terminal's capability or capabilities (what service or services it can provide);
- any other condition associated with use of the service (e.g. a user defined or preconfigured condition such as only when the first and second terminals are a certain combination of device types, only at certain times of day, only if the call is a certain type of call such as a video call, only when involved in a multiparty call with more than two participants, etc.).

After the setting has been stored, time passes. On some later occasion, at step T10 the user decides to conduct a voice or video call (e.g. after going out for the day with his or her first, mobile terminal 102i while the second terminal 102ii remains at home, and then later returning home so the two terminals return to proximity). The call engine 213 on the first-near-end terminal 102i establishes the call with the far-end terminal 102iii. "Establishing" here may comprise the user of the first terminal 102i making an outgoing call, or accepting an incoming call.

At this time, in response to the user making or accepting the call, at step T20 the configuration module 216 retrieves the configuration setting, comprising the user's prior selection from the time the second near-end terminal 102*ii* was originally detected and any of the above additional pieces of data.

Upon retrieving the setting, the detection module 214 may perform a check to confirm whether the first-near end terminal 102*i* is currently in the proximity of the second near-end terminal 120*ii*, for example to check that the first terminal is back on the local network 101*a* (e.g. based on the SSID) and/or whether it can see the second terminal 102*ii* on the local network (e.g. based on its address). However in embodiments, as long as the second terminal 102*ii* is there, the detection module 214 does not need to go through the process of detecting the second terminal's capabilities again as it already has this information stored in the configuration setting.

Assuming the two near-end terminals 102*i*, 102*ii* are still or again in proximity, in some embodiments the detection module 214 may also provide the user with another prompt to confirm he or she wants to use the service of the second terminal 102*ii* on this particular occasion. However, this can be a simplified prompt compared with the first prompt at steps S20-S30, as it can already be assumed the user has already understood the nature of the service and has accepted it for potential use. For example when the first terminal 102*i* rings upon an incoming call, the user could just be presented with two large buttons, one saying "answer with this phone" and the other saying "answer using TV", or the like; whereas at step S20 the notification would have explained the nature of the decision in more detail. Alternatively, the use of the second terminal's service could be completely automatic upon making or answering a call. For example, as long as the user has pre-selected it and the detection module 214 finds current proximity of the second terminal 102*ii*, the configuration module may automatically select the use of the service without prompt; or may automatically select it in additional dependence on any condition forming part of the retrieved configuration setting (e.g. only if the call is a video call, etc.).

In another alternative implementation, the user is not notified at step S20, when the second near-end terminal 102*ii* is originally detected. Instead the configuration module 216 may automatically store the configuration at the time without prompting the user for a selection, and the step of notifying can be performed at step T10, when the user makes or receives a call. In this case the user may be prompted at that point whether he or she wishes to use the service from the second terminal 102*ii*.

At step T30 the first near-end terminal 102*i* then begins to conduct the call with the far-end user terminal 102*iii*, using the service of the second near-end terminal 102*ii* based on the configuration setting retrieved from the non-volatile storage. As mentioned, in embodiments this may comprise the second terminal 102*ii* being used to play out an audio or video stream of the call. In embodiments this may be achieved by receiving the stream at the first terminal 102*i* from the far-end terminal 102*iii* over the wider network 101, and forwarding the stream from the first terminal 102*i* to the second terminal 102*ii* over the local network. Alternatively the first terminal 102*i* could instruct the far-end terminal 102*iii* to redirect the stream directly to the second terminal 102*ii*. In another situation, the second terminal 102*ii* is used to generate (e.g. capture) an audio or video stream of the call. In embodiments this may be achieved by receiving the stream at the first terminal 102*i* from the second terminal 102*ii* over the local network 101*a*, and forwarding the stream from the first terminal 102*i* to the far-end terminal 102*iii* over the wider network. Alternatively the first terminal 102*i* could instruct the second terminal 102*ii* to redirect the stream directly to the far-end terminal 102*ii*. Either way, while the second terminal 102*ii* handles one or more of the streams, the first terminal 102*i* retains possession of call signalling and/or continues to generate or play out or more other streams of the call.

In another embodiment, the second near-end terminal 102*ii* comprises an analogue telephone adaptor (ATA), the network 101 comprises an analogue telephone network, and the far-end user terminal 102*iii* is an analogue telephone. The ATA is a device which plugs into a more traditional analogue telephone at the near end and connects it to the packet-switched network 101 (typically the Internet). In this example, the call-related service comprises use of the ATA to render a packet-based call received over the network 101 and transfer it to the first near-end terminal 102*i*.

The following now describes in more detail some examples for determining proximity between the first near-end terminal 102*i* and the second near-end terminal 102*ii*, e.g. as implemented in the detection module 214 and at step S10.

Where two devices 102*i*, 102*ii* share a common external IP address (e.g. public IP, or are on the same private network in the context of IPv6) it may be assumed that they are on the same network. For a consumer this means that they are likely to be co-located geographically.

Where communication can be established between these devices (whether directly or with cloud assistance), this may provide a further validation in that these devices may be considered to have a degree of 'implicit trust' (although to a lesser degree in the case where cloud assistance is required). For example in the case where a home shares a common internet connection it is possible (and increasingly likely) that there might be devices sharing a common network. Consider:—

(A) where a direct single hop IP connection can be made then likely they are on the same network and segment,
(B) where the devices share the same subnetwork (addressing space) then likely they are on the same network and segment,
(C) where the devices connect to a device with a common MAC interface address then likely they are on the same network and segment (in these cases with a high degree of probability); or (D) Where the devices are able to connect to each other (multi-hop), but directly they are likely on the same network—e.g. two devices on a small wireless LAN having two routers (in this case with a lower degree of probability).

One or more of these tests may also be combined with a shared token (either common user identity, passcode (as with Bluetooth), cryptographic key or other shared element—such shared key being prompted as a result of detection of any of the criteria (A) to (D) above; then it can be assumed that there is a trust relationship.

There is an additional option which is available to further refine the relative location dimension—which is the time taken for a packet to traverse the network between the two devices. In this context:—

(E) a simple RTT (round trip time) between the two devices provides a proxy for distance;
(F) this may be further refined by making allowances for intermediate devices (e.g. routers, switches etc.)—who's impact can be calculated; and/or
(G) the relative difference in time in RTT between the two devices and a fixed third point (assuming a common egress/ingress to the shared network defined above there is no real point in triangulating using two fixed external points) where a common RTT would increase probability of co-location;

Additionally, the fact that there may be multiple shared network paths between two devices using different network media, i.e. different types of access technology. For example wired, wireless LAN, personal area network (e.g. Bluetooth) and potentially other techniques might be used to further increase certainty. For instance:

(H) if the two devices can hear each other via an ad-hoc access technology like Bluetooth), this may indicate they are more likely to be close to one another than if only able to connect on the WLAN; or (I) if the two devices are in range of one another via an ad-hoc access technology like Bluetooth, and are on the same WLAN (e.g. Wi-Fi), this may indicate they are more likely to be close to one another than if only able to connect on the WLAN.

In yet another embodiment, the first terminal 102i is arranged to determine its geographic location using a geographic location technology, such as GPS or another satellite based location technology, or such as cell triangulation. The first terminal may then determine whether its geographic location is within an geographic area associated with the second terminal 102ii, for example as follows.

(J) The first device may determine its own geographic coordinates (e.g. GPS coordinates) and query the geographic coordinates (e.g. GPS coordinates) of the second device, e.g. querying that device for a read it has itself taken. The first device may then determine whether the two devices are within a threshold range based on these geographic coordinates.

(K) Alternatively if the second device has a fixed location registered with a server of a location service, e.g. is a household appliance, the first device may look-up the geographic location of the second device, e.g. to find its postal address. The first device may then determine whether its geographic coordinates (e.g. GPS coordinates) are within a geographic area associated with the location returned from the location service, e.g. whether within an area on a map associated with the postal address.

In yet another alternative, it is possible for devices to make a determination using environmental data (which could be compared in the cloud, or fingerprints of the environment exchanged between the devices)—an example here would be that both devices sample the sound from their surroundings by sampling the sound the pattern of sound can be compared using peaks and troughs in sound and an accurate time reference to correlate the 'environments' around the devices. Alternatively the second device could introduce a sound into the environment which the first device attempts to detect, or vice versa. If the one device can hear the other, they may be determined to be co-located.

Thus in embodiments, proximity between a first user terminal and a second terminal may be determined based on sound data common to the first and second terminals, and detected by one or both of the two user terminals—either a sound profile of the environment in which the first and second mobile user terminals are located, or a sound deliberately emitted into the environment by one of the first and second terminals to be detected by the other.

(L) In the first case, each of the first and second user captures sound data from its surroundings and the sound data from the two are compared (at either terminal or another network element such as a server). The sound could be an incidental ambient sound such as background music or background conversation, or a sound deliberately introduced into the environment by another element for that purpose, e.g. a sound signature emitted by the router or access point. If the sound detected by the first and second terminals is found to be sufficiently similar, e.g. based on a correlation or pattern matching algorithm, then it may be determined that the terminals are likely to be in the same environment (e.g. same room) and therefore in effect co-located to within an acceptable degree of proximity.

(M) In the second case one of the first and second terminals deliberately emits a sound signature into the environment, and the other of the first and second terminals determines whether it can detect the signature, e.g. by matching to a predetermined instance of the signature stored at that terminal. If so it may be determined that the terminals are likely to be in the same environment (e.g. same room) and therefore in effect co-located to within an acceptable degree of proximity.

In embodiments any one or a combination of the above tests may be applied. The tests may be determined for example by the decision module 114 of the first terminal 102i querying the second terminal 102ii, or by querying a network element such as a router, access point or server which has record of the relevant information about the second terminal (e.g. the fact that it connects to the same sub network, and/or its IP address, etc.).

It will be appreciated that the above embodiments have been described only by way of example.

In alternative implementations, any or all of the detection module 214, notification module 215 and/or configuration module could be implemented at network element such as a server. For example the server may be arranged to receive information such as the IP addresses of the first and second devices 102i, 102ii or an identifier of the sub-network to which they connect (e.g. an ID of the access point or router 103), and to determine proximity centrally. The determination may then be sent to the first terminal 102i, or the server may also be configured to generate the notification at the server and send that to the first terminal. Further, the configuration setting may be stored at a server, and any determination resulting from those configurations communicated from there to the first terminal 102i. Alternatively any or all of these functions could be implemented at the router or access point 103. Further, the above has been described in terms of software modules 212, 213, 214, 215, 216, but it is not excluded that any of these modules is implemented partially or wholly in dedicated hardware.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. Apparatus for use in relation to a first near-end terminal, the first near-end terminal being a mobile user terminal operable to establish voice or video calls with one or more far-end user terminals over a network, the apparatus comprising:
a detection module arranged to detect when the first near-end terminal is within a relative proximity of a second near-end terminal available to provide a call-related service in relation to one or more of the voice or video calls, the detection comprising comparing environmental data detected by the first near-end terminal and the second near-end terminal to determine a correlation indicative of the relative proximity, the environmental data comprising sound sampled from surroundings of the first near-end terminal and the second near-end terminal;
a notification module arranged to output a notification to a user of the first near-end terminal based on said detection, notifying the user of the call-related service; and
a configuration module operable, in response to said detection, to store a configuration configuring the first near-end terminal as having the second near-end terminal identified for later provision of the call-related service.

2. The apparatus of claim 1, wherein the notification module is arranged to automatically output the notification when the first and second near-end terminals are detected to be within said proximity.

3. The apparatus of claim 2, wherein the notification prompts the user for a user selection as to whether to accept use of the call-related service, and the configuration module is arranged to store said setting on condition of said user selection being affirmative.

4. The apparatus of claim 1, wherein the configuration module is arranged to automatically retrieve the configuration setting for making use of the call-related service after the first terminal and/or second near-end terminal has departed from and then returned to said proximity.

5. The apparatus of claim 1, wherein the configuration module is arranged to automatically retrieve the configuration setting when the user later makes one of the voice or video calls, thereby making use of the call-related service in the call.

6. The apparatus of claim 1, wherein the second near-end terminal is a user terminal providing a media end-point, and wherein the call-related service comprises use of the second near-end terminal to play out or generate at least one of an audio or video stream of the call.

7. The apparatus of claim 6, wherein the first near-end terminal continues to control the call while the second near-end terminal plays out or generates the at least one stream.

8. The apparatus of claim 6, wherein the first near-end terminal plays out or generates at least one other audio or video stream of the call.

9. The apparatus of claim 1, wherein the second near-end terminal comprises an analogue telephone adaptor, the call-related service comprising use of the second near-end terminal to render a call received over the network.

10. The apparatus of claim 1, wherein the detection module is further arranged to detect when the first and second near-end terminals are within said proximity based on one or more of:
the first and second near-end terminals both being connected to a same local network;
the first and second near-end terminals sharing an address space being a subset of addresses of a packet-switched network; or
the first and second near-end terminals both connecting to a same network interface address of an intermediate network equipment.

11. The apparatus of claim 1, wherein the detection module is further arranged to detect when the first and second near-end terminals are within said proximity based on: using a satellite-based positioning system or other geographic localization technology to detect that a geographic location of the first near-end terminal is within a proximity of a geographic location of the second near-end user terminal.

12. The apparatus of claim 1, wherein the detection module is further arranged to detect when the first and second near-end terminals are within said proximity based on the first and second near-end terminals being separated by no more than a threshold number of hops.

13. The apparatus of claim 1, wherein the detection module is further arranged to detect when the first and second near-end terminals are within said proximity based on a transmission time of a packet travelling between the first and second near-end terminals.

14. The apparatus of claim 1, wherein the detection module is further arranged to detect when the first and second near-end terminals are within said proximity a type of access technology currently available for communicating between the first and second near-end terminals.

15. The apparatus of claim 1, wherein the detection module is further arranged to detect availability of the call-related service in further dependence on a shared authentication element of the first and second near-end terminals.

16. The apparatus of claim 1, wherein the apparatus is implemented at the first near-end terminal.

17. The apparatus of claim 1, wherein the network comprises a packet-based network.

18. The apparatus of claim 1, wherein the second near-end terminal is a mobile user terminal, mobile phone, tablet, laptop computer, desktop computer, games console, hi-fi or stereo system, television or set-top box.

19. A system comprising:
one or more processors; and
one or more computer-readable memories, coupled to the one or more processors, comprising instructions for use in relation to a first near-end terminal, the first near-end terminal being a mobile user terminal operable to establish voice or video calls with one or more far-end user terminals over a network, the instructions executable by the one or more processors to perform operations comprising:

- detecting when the first near-end terminal is within a relative proximity of a second near-end terminal available to provide a call-related service in relation to one or more of the voice or video calls, the detecting comprising comparing environmental data detected by the first near-end terminal and the second near-end terminal to determine a correlation indicative of the relative proximity, the environmental data comprising sound sampled from surroundings of the first near-end terminal and the second near-end terminal;
- based on said detection, outputting a notification to a user of the first near-end terminal notifying the user of the call-related service; and
- in response to said detection, storing a configuration setting configuring the first near-end terminal as having the second-near end terminal identified for later provision of the call-related service.

20. A method to establish packet-based voice or video calls from a first near-end terminal with one or more far-end user terminals over a network, the method comprising:

- detecting when the first near-end terminal is within a relative proximity of a second near-end terminal available to act as a media end-point for one or more of the voice or video calls established via the first near-end user terminal, the detecting comprising comparing environmental data detected by the first near-end terminal and the second near-end terminal to determine a correlation indicative of the relative proximity, the environmental data comprising sound sampled from surroundings of the first near-end terminal and the second near-end terminal;
- when the first and second near-end terminals are detected to be within said proximity, automatically outputting a notification to a user of the first near-end terminal, the notification notifying the user of the availability of the second near-end user terminal as a media endpoint for one or more of the calls, and prompting the user for a user selection as to whether to accept the second near-end terminal for use as said media end-point;
- in response to said detection, and on condition that said user-selection is affirmative, storing a configuration setting in non-volatile storage, configuring the first near-end terminal as having the second-near end terminal selected for use as said media end-point; and
- on a later occasion when the user makes one of said calls, after the first and second near-end user terminals have departed from and then returned to being within said proximity, automatically detecting the second near-end terminal and retrieving the configuration setting from the non-volatile storage, thereby using the second near-end user terminal to play or generate at least one voice or video stream of the call while the first near-end user terminal controls the call and/or plays out or generates at least one other voice or video stream of the call.

* * * * *